(12) United States Patent
Tiesler

(10) Patent No.: US 6,619,718 B1
(45) Date of Patent: Sep. 16, 2003

(54) MODULAR SUN VISOR AND METHOD OF ASSEMBLING SAME

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/083,244

(22) Filed: Feb. 25, 2002

(51) Int. Cl.[7] .................................................. B60J 3/00
(52) U.S. Cl. .................................... 296/97.1; 296/97.9
(58) Field of Search .............................. 296/97.1, 97.5, 296/97.9, 97.12

(56) References Cited

U.S. PATENT DOCUMENTS

| | | | | |
|---|---|---|---|---|
| 2,057,009 | A | * 10/1936 | Chadwick | 296/97.12 |
| 2,901,038 | A | * 8/1959 | Herr et al. | 160/354 |
| 3,193,323 | A | * 7/1965 | Herr et al. | 296/97.12 |
| 3,405,969 | A | 10/1968 | Creel | 296/97 |
| 3,827,748 | A | 8/1974 | Herr et al. | 296/97 H |
| 4,458,938 | A | * 7/1984 | Viertel et al. | 296/97.1 |
| 4,477,116 | A | * 10/1984 | Viertel et al. | 296/97.1 |
| 4,491,899 | A | * 1/1985 | Fleming | 362/492 |
| 4,626,019 | A | * 12/1986 | Tung et al. | 296/97.1 |
| 4,989,911 | A | * 2/1991 | Van Order | 296/97.9 |
| 5,244,244 | A | * 9/1993 | Gute et al. | 296/97.8 |
| 5,308,137 | A | 5/1994 | Viertel et al. | 296/97.1 |
| 5,374,097 | A | 12/1994 | George et al. | 296/97.5 |
| 5,556,154 | A | 9/1996 | Vaxelaire | 296/97.1 |
| 5,727,837 | A | 3/1998 | Viertel | 296/97.1 |
| 5,823,603 | A | 10/1998 | Crotty, III | 296/97.12 |
| 5,895,087 | A | 4/1999 | Viertel et al. | 296/99.5 |
| 6,007,136 | A | 12/1999 | Zittwitz et al. | 296/97.9 |
| 6,024,399 | A | * 2/2000 | Viertel et al. | 296/97.11 |
| 6,033,005 | A | 3/2000 | Crotty, III | 296/97.1 |
| 6,131,985 | A | 10/2000 | Twietmeyer et al. | 296/97.12 |
| 6,220,644 | B1 | 4/2001 | Tiesler et al. | 296/97.11 |
| 6,302,467 | B1 | 10/2001 | Crotty, III et al. | 296/97.1 |
| 6,347,824 | B1 | * 2/2002 | Akouri et al. | 296/97.5 |

FOREIGN PATENT DOCUMENTS

JP 59014516 A * 1/1984 .................... 296/97.5

* cited by examiner

Primary Examiner—D. Glenn Dayoan
Assistant Examiner—Paul Chenevert
(74) Attorney, Agent, or Firm—Bill C. Panagos

(57) ABSTRACT

A modular sun visor includes upper and lower visor bezels configured to be attached to different sized visor blades. The upper and lower visor bezels are snapped together and capture one of the visor blades between them. The visor blade is then heat staked to the bezels. An elbow arm is pivotally connected to at least one of the visor bezels, and is also pivotally connected to a vehicle. The sun visor is further selectively attachable to the vehicle at a center support. When a sun visor is required for a different make or model of vehicle, only the visor blade is changed; thus, production and inventory costs are reduced.

24 Claims, 5 Drawing Sheets

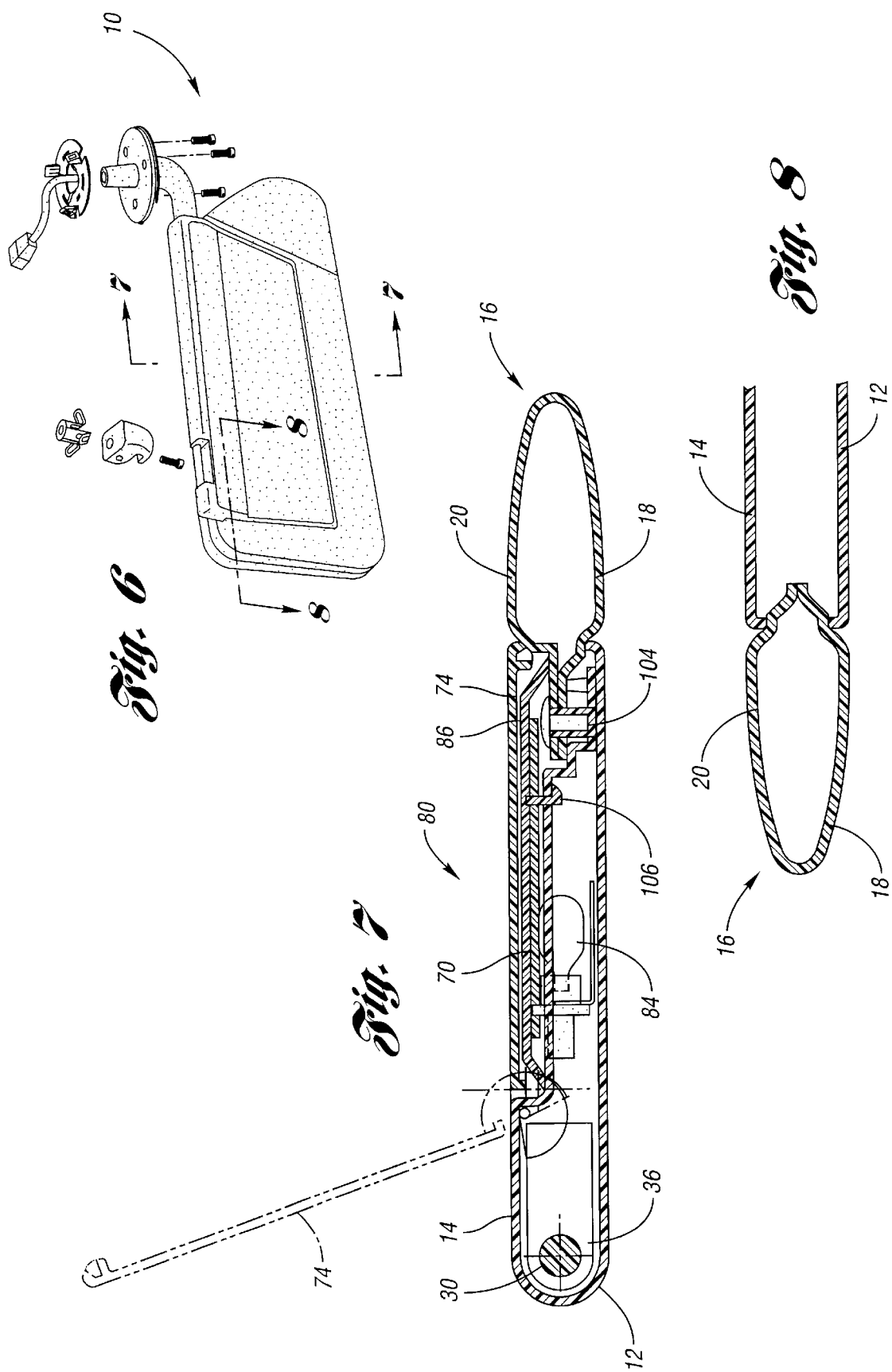

MODULAR SUN VISOR AND METHOD OF ASSEMBLING SAME

BACKGROUND OF THE INVENTION

1. Field of the Invention

The present invention relates to a modular sun visor and a method of assembling a sun visor.

2. Background Art

The use of sun visors in vehicles is well known. Attached to the vehicle roof adjacent to the windshield, sun visors are made in various sizes and are made from a variety of materials. Typical sun visors comprise a stiff inner core, often made of a rigid polymer, surrounded by a cloth covering. Because of the wide variation in the size of vehicles, many different sizes of sun visors are necessary to accommodate the needs of vehicle manufacturers. In a standard manufacturing process, each different size of sun visor may require different tooling, which adds to production costs. In addition, inventory costs can increase as the many different sizes of sun visors are warehoused.

One attempt to make a sun visor more modular, and therefore increase the number of components common to different sizes of sun visors, is described in U.S. Pat. No. 6,131,985 issued to Twietmeyer et al. on Oct. 17, 2000. Twietmeyer et al. describes a sun visor with a variety of modular core components covered with an outer covering. The core components can be assembled such that they can be used in visor assemblies for a number of different makes and models of vehicles. However, in order to accommodate different sizes of outer coverings, the core component assemblies must themselves be manufactured in different lengths. Hence, at least some of the shortcomings of prior art sun visors remains.

Accordingly, it is desirable to provide a modular sun visor that overcomes the shortcomings of prior art sun visors by further reducing the number of differently sized components that are required to produce sun visors of different sizes.

SUMMARY OF THE INVENTION

It is an aspect of the present invention to provide a modular sun visor that can be used on a wide variety of vehicle makes and models.

It is another aspect of the invention to provide a modular sun visor that reduces tooling changes and production setup time for the sun visor manufacturer.

It is a further aspect of the invention to provide a modular sun visor that reduces production and inventory costs.

Accordingly, a sun visor assembly for use in a vehicle is provided that comprises a first visor bezel and a second visor bezel. The second visor bezel is attached to the first visor bezel. A visor blade is at least partially captured between the two visor bezels.

Another aspect of the invention provides a system of modular sun visors that comprises a plurality of first visor bezels. A plurality of second visor bezels are each configured to mate with any one of the first visor bezels. The system also includes a plurality of visor blades, each one differing from the others by at least one dimension. Each of the visor blades can be captured by any two of the mating first and second visor bezels.

A further aspect of the invention provides a method of assembling a sun visor for a vehicle that comprises providing a first visor bezel that has a support portion. The first visor bezel is configured to be attached to any visor blade chosen from an inventory of differently sized visor blades. The method further includes choosing a visor blade from the inventory of differently sized visor blades and capturing the chosen visor blade between the first visor bezel and a second visor bezel. The second visor bezel has a support portion that is configured to be in substantial alignment with the support portion of the first visor bezel when the chosen visor blade is captured between the two visor bezels.

The above object and other objects, features, and advantages of the present invention are readily apparent from the following detailed description and best mode for carrying out the invention when taken in connection with the accompanying drawings.

BRIEF DESCRIPTION OF THE DRAWINGS

FIG. 6 is a partially exploded perspective view of the sun visor assembly of FIG. 1;

FIG. 7 is a sectional view of the sun visor assembly taken through line 7—7 in FIG. 6;

FIG. 8 is a sectional view of the sun visor assembly taken through line 8—8 in FIG. 6;

DETAILED DESCRIPTION OF THE PREFERRED EMBODIMENT(S)

Figure 1:
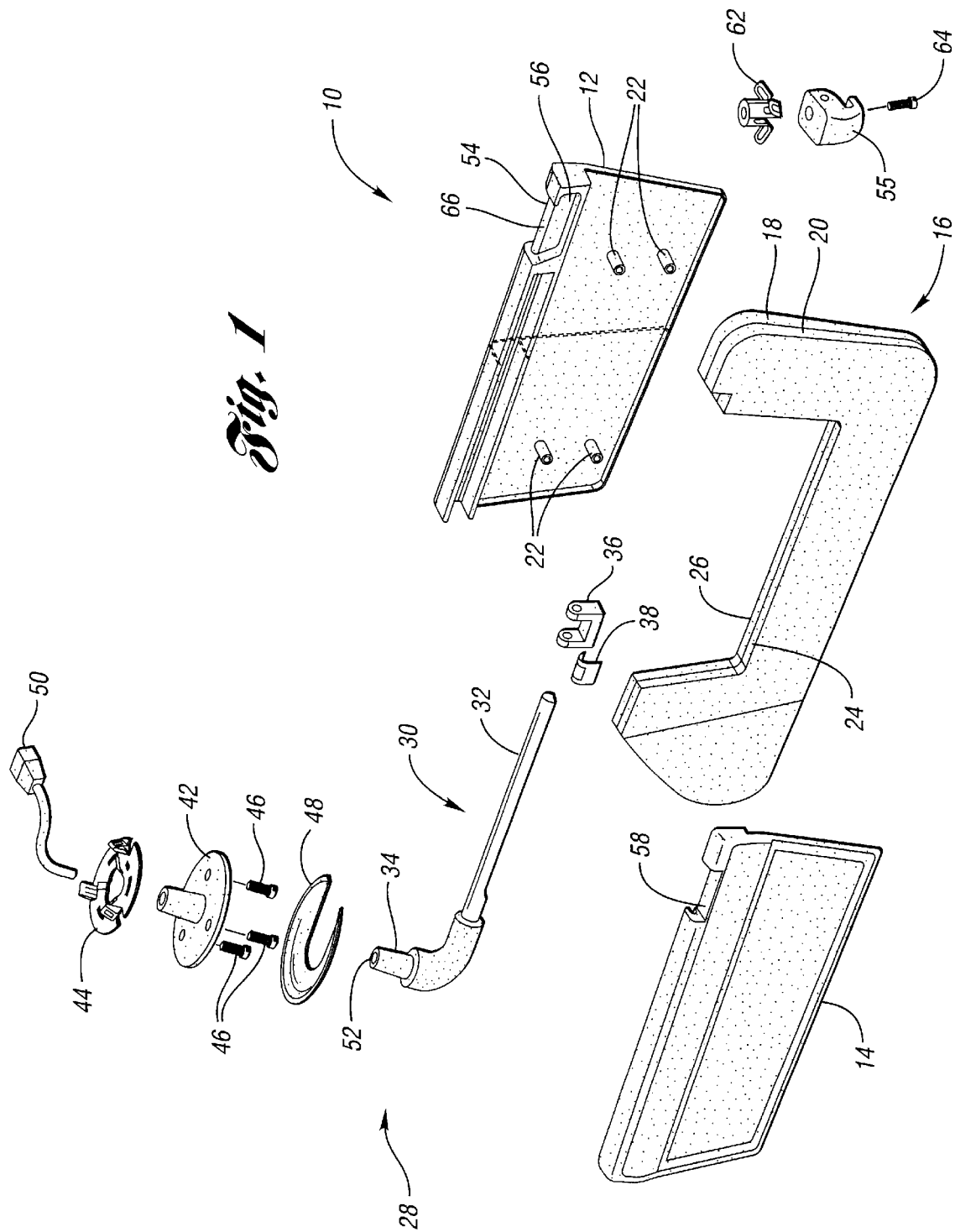
FIG. 1 is an exploded perspective view of a sun visor assembly in accordance with the present invention.

FIG. 1 shows an exploded perspective view of a sun visor assembly 10 in accordance with the present invention. Included in the sun visor assembly 10 is a first, or lower visor bezel 12, a second, or upper visor bezel 14, and a visor blade subassembly 16. The lower and upper bezels 12, 14 are typically made from a molded heat resistant polymer such as a high heat acrylonitrile butadiene styrene (HH ABS), though the use of other materials is contemplated. The upper visor bezel 14 includes a vanity subassembly (see FIGS. 4 and 7) that has been removed from this view for clarity. The visor blade subassembly 16 includes a first, or lower visor blade portion 18 and a second, or upper visor blade portion 20. The lower and upper visor blade portions 18, 20 are typically made from a molded polymer such as a high crystalline polypropylene (HCPP), and are then covered with a cloth material (not shown). Of course other materials can be used, including polymers molded with a finished surface to obviate the need for the cloth covering.

The lower visor bezel 12 and the upper visor bezel 14 are configured to snap together. Snaps 22 on the first visor bezel 12 attach to mating elements (not shown) on the second visor bezel 14. Each of the visor blade portions 18, 20 includes a cutout 24, 26. The cutouts 24, 26 allow the snaps 22 to traverse at least a portion of the thickness of the visor blade subassembly 16 and mate with their corresponding elements on the second visor bezel 14. When the first visor bezel 12 is snapped together with the second visor bezel 14, the visor blade subassembly 16 is captured between them. After the visor blade subassembly 16 is captured, it is heat staked to the two visor bezels 12, 14. Although heat staking is the preferred method, other methods of attachment are also contemplated, including sonic welding and adhesives.

The visor blade subassembly 16 is chosen based on the requirements of the vehicle into which the sun visor assembly 10 is to be installed. Although visor blade subassemblies such as 16 may have different widths or lengths to accommodate the requirements of different vehicles, the cutouts, shown as 24, 26 on the visor blade subassembly 16, will have substantially the same dimensions. This allows the lower and upper visor bezels 12, 14 to be used with sun visor subassemblies in many different makes and models of vehicles. The cutouts 24, 26 not only allow the snaps 22 to mate with their corresponding elements on the second visor bezel 14, but also reduce the weight and the amount of material required to produce the visor blade subassembly 16. It should be noted however, that a visor blade subassembly need not have cutouts to accommodate the snaps 22. As an alternative to cutouts, the visor blade subassembly can be manufactured with a series of holes aligned with the snaps 22 to allow the two visor bezels 12, 14 to snap together.

Also included in the sun visor assembly 10 is an elbow rod subassembly 28. The elbow rod subassembly 28 includes an elbow rod 30 that has a first, or horizontal portion 32 and a second, or vertical portion 34. The horizontal portion 32 of the elbow rod 30 is attached to the first and second visor bezels 12, 14 with a detent carrier 36 and a detent clip 38. This type of attachment allows a vehicle occupant to pivot the visor blade subassembly 16 about the horizontal portion 32 of the elbow rod 30. Another type of elbow rod subassembly that can be used in the present invention is described in U.S. Pat. No. 6,220,644 issued to Tiesler et al. on Apr. 24, 2001. Tiesler et al. describes an elbow rod subassembly that allows for lateral movement of a sun visor, thereby providing additional flexibility in positioning the sun visor.

Figure 2:
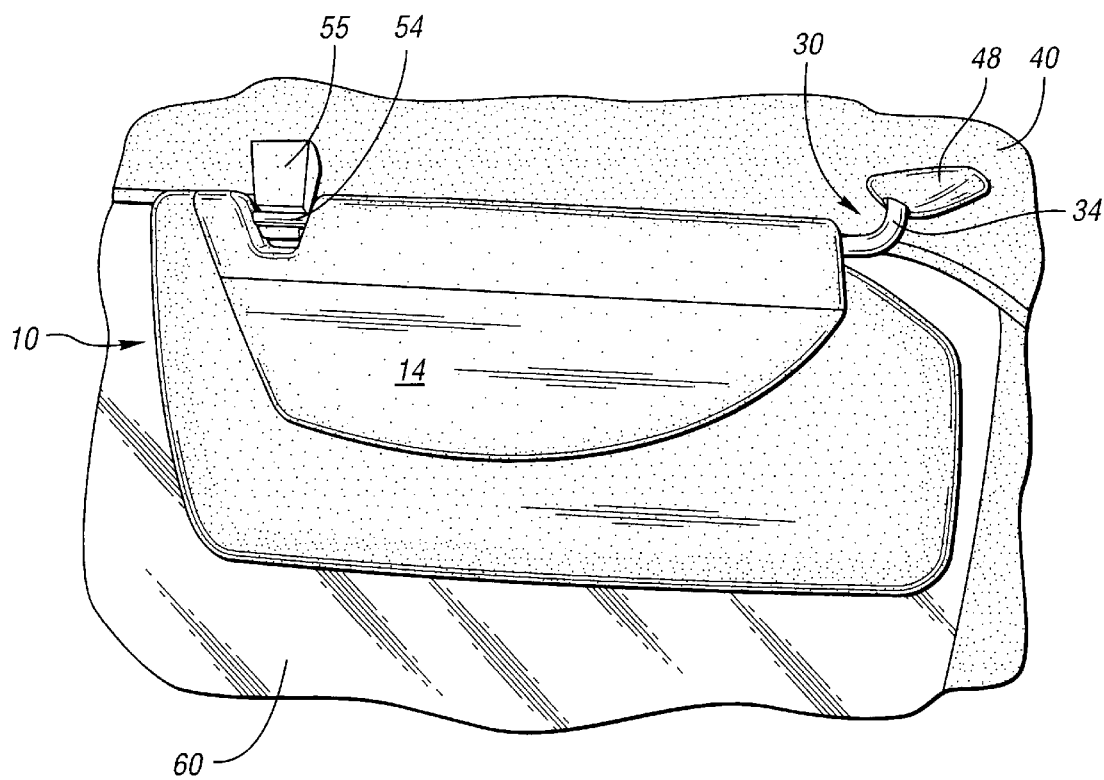
FIG. 2 is a perspective view of a sun visor assembly attached to a roof portion of the interior of a vehicle.

Turning to FIG. 2, it is seen that the vertical portion 34 of the elbow rod 30 attaches to a roof portion 40 of a vehicle. The vertical portion 34 attaches to an outboard bezel 42, which is attached to an outboard clip 44 using screws 46, see FIG. 1. The outboard clip 44 snaps into the roof portion 40 of the vehicle. A trim cap 48 covers the outboard bezel 42 to present a finished surface to the vehicle occupants. A portion of a wiring harness 50 is also shown in FIG. 1. Because the second portion 34 of the elbow rod 30 contains an opening 52, wires can be fed through the opening 52 to accommodate electrical components in the sun visor assembly 10, as discussed below.

The sun visor assembly 10 also includes a support rod 54 that attaches to a support 55 that is mounted to the roof portion 40 of a vehicle, as shown in FIG. 2. The support rod 54 and the support 55 are commonly referred to as a "center support rod" and a "center support," respectively. In this embodiment, the center support rod 54 is molded into a support portion 56 (or center support portion) of the lower visor bezel 12. The upper visor bezel 14 also contains a (center) support portion 58 that is substantially aligned with the center support portion 56 of the first visor bezel 12 when the two visor bezels are snapped together. The center support 55 is configured to hold the center support rod 54 when the sun visor assembly 10 is adjacent to a windshield 60, but allows a vehicle occupant to pivot the sun visor assembly 10 to a position adjacent to a side window (not shown). A center support clip 62 is snapped into the roof portion 40 of the vehicle and a screw 64 secures the center support 55 to the center support clip 62.

Because the size of the first and second visor bezels 12, 14 remains constant despite the use of differently sized visor blade assemblies, the distance between a center point 66 on the center support rod 54 and the second portion 34 of the elbow rod 30 also remains constant. This allows the center support 55 to be attached to the roof portion 40 in the same location on many different makes and models of vehicles. This helps to reduce both design and production costs for vehicle manufacturers by eliminating one of the variables encountered when changing vehicle platforms. In addition, the vehicle manufacturer need not produce or inventory different sizes of center supports, since the center support 55 will accommodate all of the sun visor assemblies made in accordance with the present invention. Thus a clear benefit is realized both by the manufacturer of the sun visor assembly 10 and the manufacturer of the vehicle. Not only are production costs reduced because there are fewer differently sized components to produce, but inventory costs are lowered as well, since there are fewer differently sized components to warehouse.

Figure 3:
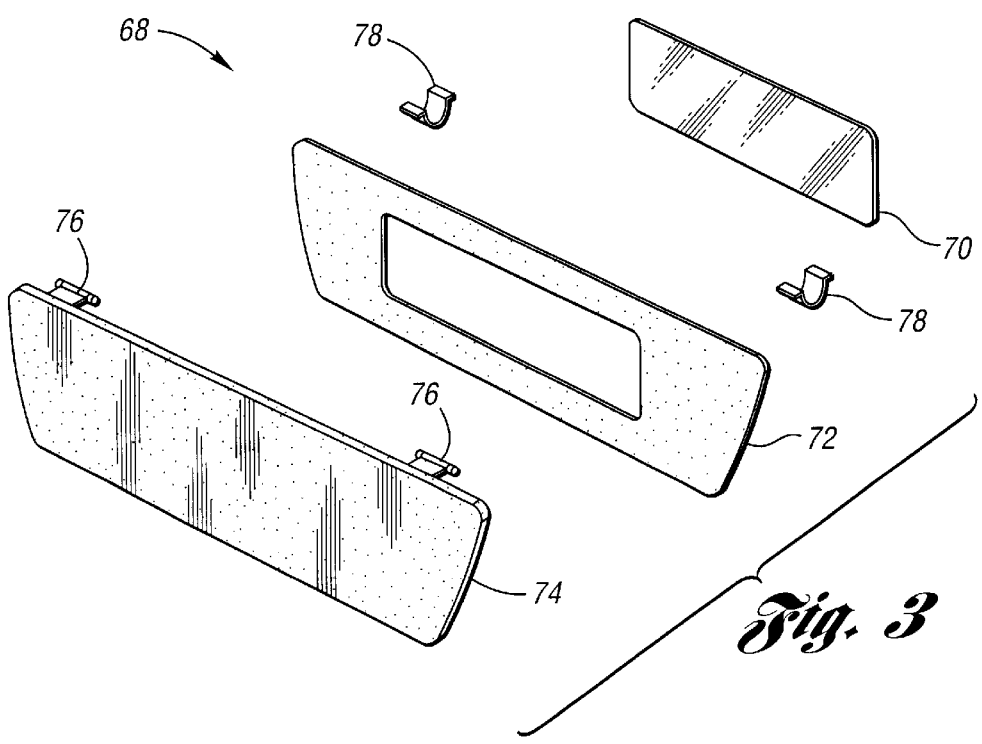
FIG. 3 is an exploded perspective view of a vanity subassembly used in various embodiments of the present invention.

Another advantage of the present invention is that a vanity subassembly, such as 68 shown in FIG. 3, can be attached to any upper visor bezel to be used with any of the sun visor assemblies made in accordance with the present invention. Included in the vanity subassembly 68 is a mirror 70, which is at least partially held in place by a vanity bezel 72. Also part of the vanity subassembly 68 is a vanity lid 74 that pivots on hinges 76. Vanity lid springs 78 keep the vanity lid 74 closed when the mirror 70 is not being accessed by a vehicle occupant. The vanity subassembly 68 represents only one of a number of different types of vanity subassemblies that can be used in the present invention.

Figure 4:
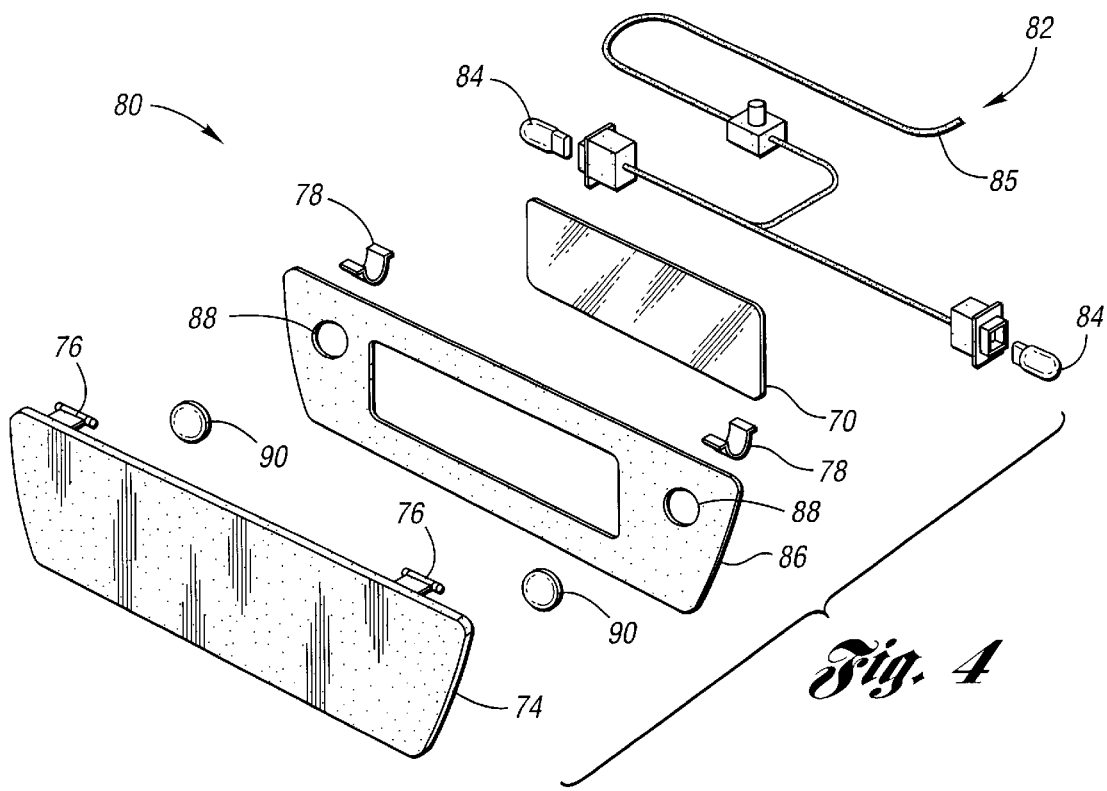
FIG. 4 is an exploded perspective view of an illuminated vanity subassembly used in various embodiments of the present invention.
Figure 5:
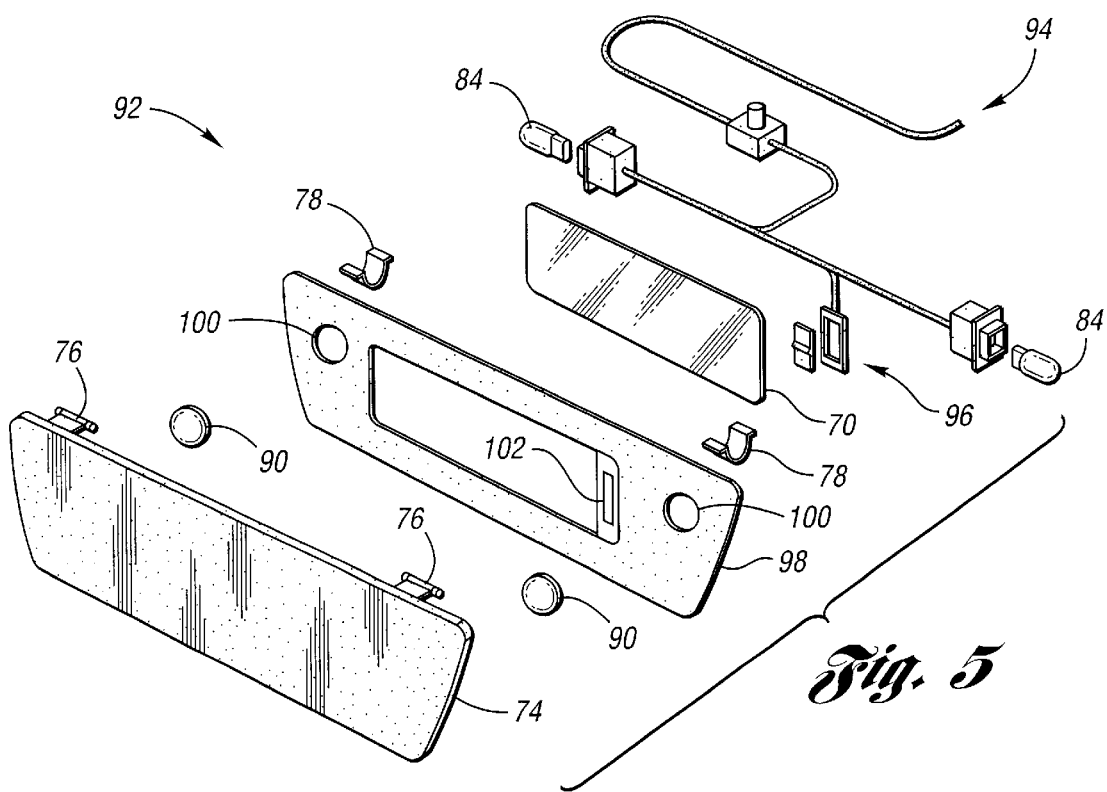
FIG. 5 is an exploded perspective view of an illuminated vanity subassembly having a dimmer switch used in various embodiments of the present invention.

A somewhat more elaborate vanity subassembly 80 is shown in FIG. 4. The vanity subassembly 80 includes many of the same components used in the vanity subassembly 68 shown in FIG. 3. For example the mirror 70, the vanity lid 74, including the hinges 76, and the vanity lid springs 78 are all common to both vanity subassemblies 68, 80. The vanity subassembly 80 however, includes an electrical subassembly 82 that has two light bulbs 84. The wiring 85 of the electrical subassembly 82 is fed through the opening 52, see FIG. 1, of the vertical portion 34 of the elbow rod 30 for connection to a power supply (not shown). A vanity bezel 86 includes openings 88 that allow the light from the light bulbs 84 to illuminate an area in front of the vanity subassembly 80 when the vanity lid 74 is in the open position. Lenses 90 cover the openings 88 of the vanity bezel 86 to protect the light bulbs 84. FIG. 5 shows another vanity subassembly 92 that represents only a slight variation over the vanity subassembly 80 shown in FIG. 4. An electrical subassembly 94 includes light bulbs 84 as before; however, in this embodiment a dimmer switch subassembly 96 is also included. A vanity bezel 98 has openings 100 to allow the light from the light bulbs 84 to illuminate the area in front of the vanity subassembly 92, and it also has a slot 102 to facilitate access to the dimmer switch subassembly 96.

FIG. 6 shows a perspective view of the sun visor assembly 10, with sections 7—7 and 8—8 shown in FIGS. 7 and 8, respectively. As seen in FIGS. 7 and 8, the visor blade subassembly 16 is captured between the two visor bezels 12, 14. The visor blade subassembly 16 is heat staked to the visor bezels 12, 14 at an attachment point 104. The elbow rod 30 pivots inside the detent carrier 36 that is installed between the lower and upper visor bezels 12, 14. The vanity subassembly 80 is attached to the upper visor bezel 14 with snaps 106, only one of which is visible in this view. The vanity bezel 86 holds the mirror 70 in place. The mirror 70 is illuminated by light bulbs 84, only one of which is seen in this view. The vanity lid 74, which is shown in solid lines in the closed position and in phantom lines in the open position, selectively covers the mirror 70.

Figure 9:
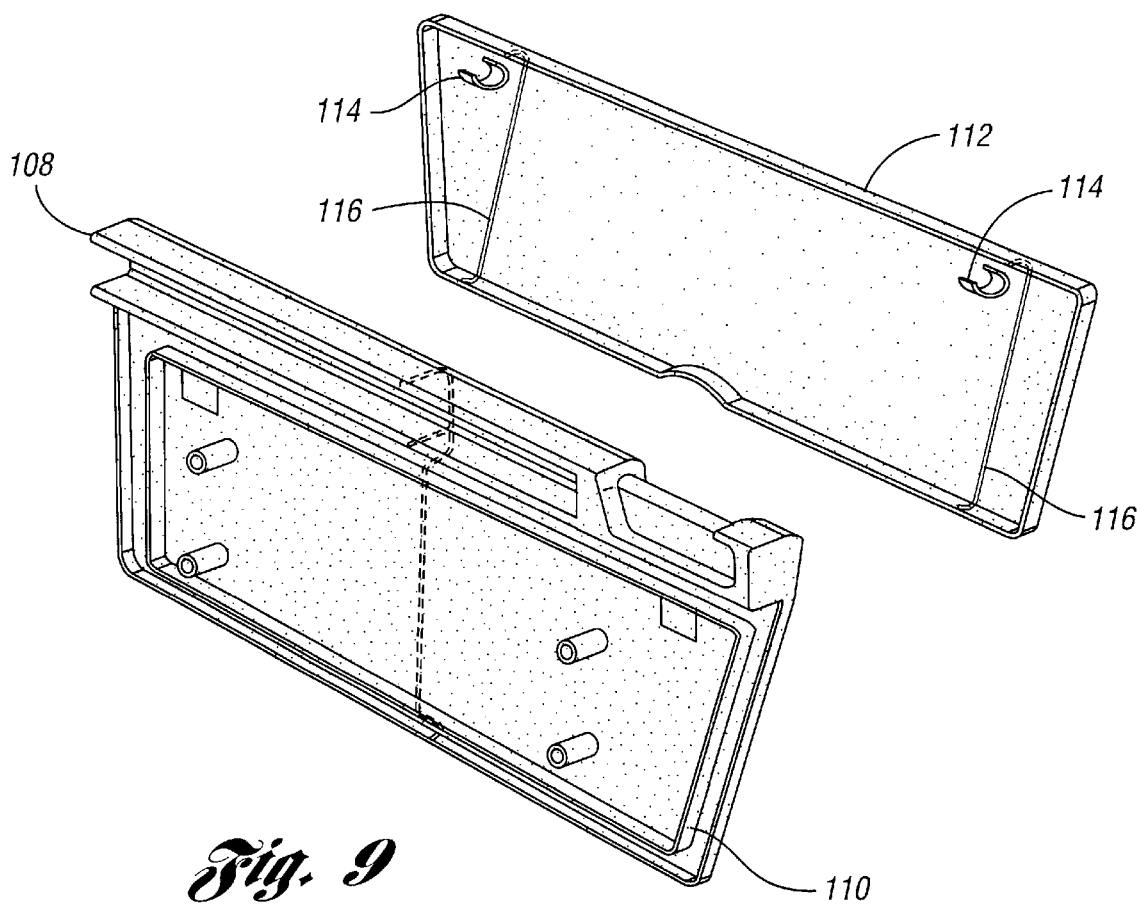
FIG. 9 is a partially exploded perspective view of a lower visor bezel having a storage compartment and a storage compartment door.
Figure 10:
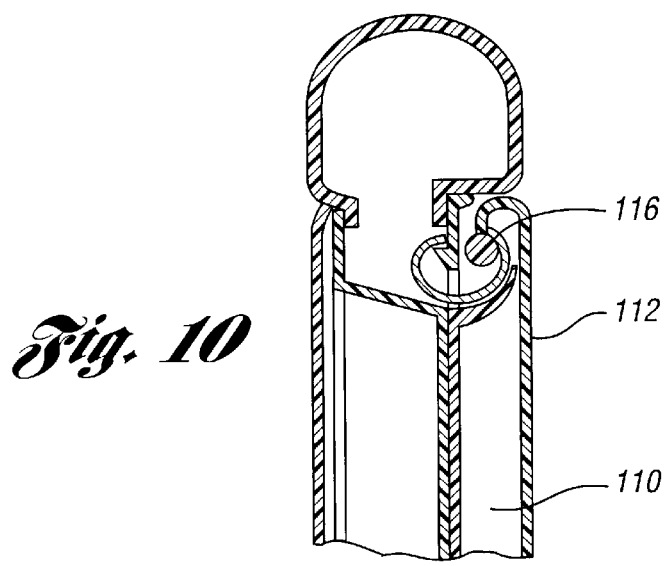
FIG. 10 is a partial sectional view of a sun visor assembly having a lower visor bezel configured with a storage compartment.

FIG. 9 shows a lower visor bezel 108 configured with a storage compartment 110. The storage compartment 110 is convenient for storing maps, papers, and other small items. A storage compartment door 112 is attached to the lower visor bezel 108 at hinges 114. This allows the door 112 to be pivoted from a closed position to an open position to allow access to the storage compartment 110. A pair of spring clips 116 ensures that the door 112 will remain closed unless a vehicle occupant is holding it open. The hinge and spring mechanism is illustrated in the partial sectional view shown in FIG. 10. In this view, the storage compartment 110 is covered by the door 112, which is held in the closed position by the spring clips 116, only one of which is visible in this view. The lower visor bezel 108 is configured to mate with any of the upper visor bezels in any of the other embodiments. This means that the mounting locations for the completed sun visor assembly is the same as for any other embodiment of the invention. This further illustrates the benefits of the present invention which allows one of the components, such as the lower visor bezel, to be modified to suit the particular needs of a customer's specific application, while maintaining compatibility with the other sun visor components. Thus, the present invention strikes a balance between commonizing components to help reduce production and inventory costs, and allowing enough flexibility to suit the needs of different customers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sun visor assembly for use in a vehicle, comprising:
   a first visor bezel;
   a second visor bezel non-integral with the first visor bezel and attached thereto; and
   a visor blade at least partially captured between the first and second visor bezels.

2. The sun visor assembly of claim 1, wherein a portion of the visor blade is sonic welded to at least one of the visor bezels.

3. The sun visor assembly of claim 1, wherein a portion of the visor blade is heat staked to at least one of the visor bezels.

4. The sun visor assembly of claim 1, further comprising an elbow rod for pivotally attaching the sun visor assembly to the vehicle.

5. The sun visor assembly of claim 1, further comprising a support rod molded into one of the visor bezels and attachable to a sun visor support.

6. The sun visor assembly of claim 1, further comprising a vanity subassembly including a mirror, a vanity bezel, and a vanity lid.

7. The sun visor assembly of claim 1, wherein the visor blade comprises a visor blade subassembly, including a first visor blade portion attached to a second visor blade portion.

8. The sun visor assembly of claim 1, wherein one of the visor bezels comprises a storage portion and a door portion, the door portion having a first position for allowing access to the storage portion and a second position for covering the storage portion.

9. A system of modular sun visors, comprising:
   a plurality of first visor bezels;
   a plurality of second visor bezels, each of the second visor bezels being configured to mate with any one of the first visor bezels; and
   a plurality of visor blades, each of the visor blades differing from the other visor blades by at least one dimension, and each of the visor blades being capturable by any two of the mating first and second visor bezels.

10. The system of modular sun visors of claim 9, wherein each of the first visor bezels includes a support portion.

11. The system of modular sun visors of claim 10, wherein each of the second visor bezels includes a support portion configured to be in substantial alignment with the support portion of a mating first visor bezel.

12. The system of modular sun visor of claim 11, further comprising a plurality of support rods, each support rod being configured to be substantially disposed in the support portion of any first or second visor bezel.

13. The system of modular sun visors of claim 9 for use in a vehicle, further comprising a plurality of elbow rod assemblies, each of the elbow rod assemblies having a first portion configured to be pivotally attachable to any of the mating first and second visor bezels, and each of the elbow rod assemblies having a second portion configured to be pivotally attachable to the vehicle.

14. The system of modular sun visors of claim 9, further comprising a plurality of vanity assemblies configured to be attachable to any one of the first or second visor bezels.

15. The system of modular sun visors of claim 14, wherein each of the vanity assemblies comprises a mirror, a vanity bezel, and a vanity lid.

16. The system of modular sun visors of claim 9, wherein each of the visor blades comprises a visor blade subassembly, including a first visor blade portion attached to a second visor blade portion.

17. The system of modular sun visors of claim 9, wherein each of the first visor bezels comprises a storage portion and a door portion, the door portion having a first position for allowing access to the storage portion and a second position for covering the storage portion.

18. A method of assembling a sun visor for a vehicle, comprising:
   providing a first visor bezel having a support portion and configured to be attached to any visor blade chosen from an inventory of differently sized visor blades;

choosing a visor blade from the inventory of differently sized visor blades; and capturing the chosen visor blade between the first visor bezel and a second visor bezel, the second visor bezel having a support portion configured to be in substantial alignment with the support portion of the first visor bezel when the chosen visor blade is captured between the two visor bezels.

19. The method of assembling a sun visor of claim 18, further comprising pivotally attaching a first portion of an elbow rod subassembly to at least one of the visor bezels.

20. The method of assembling the sun visor of claim 19 to a vehicle, further comprising attaching a second portion of the elbow rod subassembly to the vehicle.

21. The method of assembling a sun visor of claim 18, further comprising attaching a support rod to the support portion of at least one of the visor bezels.

22. The method of assembling a sun visor of claim 18, further comprising attaching a vanity subassembly to one of the visor bezels.

23. The method of assembling a sun visor of claim 18, further comprising sonic welding the captured visor blade to at least one of the visor bezels.

24. The method of assembling a sun visor of claim 18, further comprising heat staking the captured visor blade to at least one of the visor bezels.

* * * * *